United States Patent
Wang et al.

(10) Patent No.: US 11,868,738 B2
(45) Date of Patent: Jan. 9, 2024

(54) METHOD AND APPARATUS FOR GENERATING NATURAL LANGUAGE DESCRIPTION INFORMATION

(71) Applicant: TENCENT TECHNOLOGY (SHENZHEN) COMPANY LIMITED, Shenzhen (CN)

(72) Inventors: Bairui Wang, Shenzhen (CN); Lin Ma, Shenzhen (CN); Yang Feng, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 563 days.

(21) Appl. No.: 17/183,127

(22) Filed: Feb. 23, 2021

(65) Prior Publication Data
US 2021/0174031 A1 Jun. 10, 2021

Related U.S. Application Data

(63) Continuation of application No. PCT/CN2019/115079, filed on Nov. 1, 2019.

(30) Foreign Application Priority Data

Nov. 23, 2018 (CN) .......................... 201811409084.9

(51) Int. Cl.
*G06F 40/56* (2020.01)
*G06N 20/00* (2019.01)
(Continued)

(52) U.S. Cl.
CPC ............ *G06F 40/56* (2020.01); *G06F 18/253* (2023.01); *G06F 40/40* (2020.01); *G06N 20/00* (2019.01);
(Continued)

(58) Field of Classification Search
None
See application file for complete search history.

(56) References Cited

U.S. PATENT DOCUMENTS

2004/0133927 A1* 7/2004 Sternberg ............ G06F 16/7847
375/240
2014/0280223 A1* 9/2014 Ram ...................... G06F 16/93
707/736

FOREIGN PATENT DOCUMENTS

CN 103854016 A 6/2014
CN 106599198 A 4/2017
(Continued)

OTHER PUBLICATIONS

Chinese Office Action with English concise explanation of relevance regarding 2018114090849 dated Sep. 23, 2022.
(Continued)

*Primary Examiner* — Jakieda R Jackson
(74) *Attorney, Agent, or Firm* — Crowell & Moring LLP

(57) ABSTRACT

The present disclosure describes methods, devices, and storage medium for generating a natural language description for a media object. The method includes respectively processing, by a device, a media object by using a plurality of natural language description models to obtain a plurality of first feature vectors corresponding to a plurality of feature types. The device includes a memory storing instructions and a processor in communication with the memory. The method also includes fusing, by the device, the plurality of first feature to obtain a second feature vector; and generating, by the device, a natural language description for the media object according to the second feature vector, the natural language description being used for expressing the media object in natural language. The present disclosure resolves the technical problem that natural language descrip-
(Continued)

tion generated for a media object can only give an insufficiently accurate description of the media object.

18 Claims, 8 Drawing Sheets

(51) Int. Cl.
  *G06F 40/40* (2020.01)
  *G06V 20/40* (2022.01)
  *G06F 18/25* (2023.01)
  *G06V 10/80* (2022.01)
  *G06N 3/08* (2023.01)
  *G06N 3/044* (2023.01)
(52) U.S. Cl.
  CPC ............ *G06V 10/806* (2022.01); *G06V 20/46* (2022.01); *G06N 3/044* (2023.01); *G06N 3/08* (2013.01)

(56) References Cited

FOREIGN PATENT DOCUMENTS

| CN | 106778926 A | 5/2017 |
|---|---|---|
| CN | 106845443 A | 6/2017 |
| CN | 107040568 A | 8/2017 |
| CN | 107256221 A | 10/2017 |
| CN | 107766894 A | 3/2018 |
| CN | 107918782 A | 4/2018 |
| CN | 108388900 A | 8/2018 |
| CN | 108647705 A | 10/2018 |
| CN | 109871736 A | 6/2019 |
| WO | WO2016145089 A1 | 9/2016 |
| WO | WO 2018124309 | 7/2018 |
| WO | WO2018190792 A1 | 10/2018 |

OTHER PUBLICATIONS

Bairui Wang et al., "Reconstruction Network for Video Captioning," Tencent AI Lab, Mar. 30, 2018, pp. 1-10.
Rui Liang et al., "Deep natural language description method for video based on multi-feature fusion," with English abstract, Journal of Computer Applications, No. 04, Apr. 10, 2017, pp. 1179-1184.
Huanhou Xiao et al., "Video Captioning Based on C3D and Visual Elements," Journal of South China University of Technology (Natural Science Edition) No. 8, Aug. 15, 2018, 9 pages.
S. Venugopalan et al., "Translating Videos to Natural Language Using Deep Recurrent Neural Networks," NAACL, Dec. 31, 2015, 11 pages.
Extended European search report regarding EP 19 88 6674 dated Dec. 17, 2021, 9 pages.
Zhang et al., "Automatic video description generation via LSTM with joint two-stream encoding," 2016 23rd International Conference on Pattern Recognition (ICPR), IEEE, Dec. 4, 2016, pp. 2924-2929.
Kyunghyun et al., "Describing Multimedia Content Using Attention-Based Encoder-Decoder Networks," IEEE Transactions on Multimedia, IEEE, USA, vol. 17, No. 11, Nov. 1, 2015, pp. 1875-1886.
International Search Report with English translation and Written Opinion for corresponding PCT/CN2019/115079 dated Jan. 23, 2020.

* cited by examiner

METHOD AND APPARATUS FOR GENERATING NATURAL LANGUAGE DESCRIPTION INFORMATION

RELATED APPLICATION

This application is a continuation application of PCT Patent Application No. PCT/CN2019/115079, filed on Nov. 1, 2019, which claims priority to Chinese Patent Application No. 201811409084.9, filed with China National Intellectual Property Administration on Nov. 23, 2018, both of which are incorporated herein by reference in their entireties.

FIELD OF THE TECHNOLOGY

This application relates to the field of computers, and specifically, to a method and an apparatus for generating natural language description.

BACKGROUND OF THE DISCLOSURE

With the continuous development of information technologies, media objects (or media resources) such as pictures, videos, and web pages have grown explosively. To help a user quickly obtain a designated media object, description information may be generated for the media object, and the media object may be retrieved based on the description information.

At present, description information is generated mainly by using an encoder-decoder architecture in the industry. Specifically, a video segment is used as an example. First, features are extracted from each frame of image in the video segment. Then, a frame-level feature is transformed into a video-level feature through average pooling, by using an attention mechanism, or by using another method. Finally, the video-level feature is used as input of a decoder to obtain natural language description.

However, the method that uses a single codec network to generate the natural language description has a problem of low accuracy in practical applications, and consequently is difficult to be widely applied, leading to low accuracy and poor performance.

The present disclosure describes various embodiment for generating a natural language description (NLD) for a media object, addressing at least one of the issues/problems discussed above, improving the performance of providing description for the media object, which more accurately reflects content of the media object.

SUMMARY

Embodiments of this application provide a method and an apparatus for generating natural language description, to resolve at least a technical problem that natural language description generated for a media object (or a media resource) can only give an insufficiently accurate description of the media object in the related art.

The present disclosure describes a method for generating a natural language description (NLD) for a media object. The method includes respectively processing, by a device, a media object by using a plurality of NLD models to obtain a plurality of first feature vectors corresponding to a plurality of feature types. The device includes a memory storing instructions and a processor in communication with the memory. The method also includes fusing, by the device, the plurality of first feature to obtain a second feature vector; and generating, by the device, a NLD for the media object according to the second feature vector, the NLD being used for expressing the media object in natural language.

The present disclosure describes an apparatus for generating a natural language description (NLD) for a media object. The apparatus includes a memory storing instructions; and a processor in communication with the memory. When the processor executes the instructions, the processor is configured to cause the apparatus to: respectively process a media object by using a plurality of natural language description (NLD) models to obtain a plurality of first feature vectors corresponding to a plurality of feature types, fuse the plurality of first feature to obtain a second feature vector, and generate a NLD for the media object according to the second feature vector, the NLD being used for expressing the media object in natural language.

The present disclosure describes a non-transitory computer readable storage medium, storing computer readable instructions. The computer readable instructions, when executed by a processor, are configured to cause the processor to perform: respectively processing a media object by using a plurality of natural language description (NLD) models to obtain a plurality of first feature vectors corresponding to a plurality of feature types; fusing the plurality of first feature to obtain a second feature vector; and generating a NLD for the media object according to the second feature vector, the NLD being used for expressing the media object in natural language.

According to one aspect of the embodiments of this application, a method for generating natural language description information is provided, including: respectively processing a media resource by using a plurality of natural language description models, to obtain first feature vectors outputted by the natural language description models, the first feature vectors outputted by the natural language description models being corresponding to different feature types; fusing the first feature vectors outputted by the natural language description models, to obtain a second feature vector; and generating target natural language description information according to the second feature vector, the target natural language description information being used for expressing the media resource in natural language.

According to another aspect of the embodiments of this application, an apparatus for generating natural language description information is further provided, including: a processing module, configured to respectively process a media resource by using a plurality of natural language description models, to obtain first feature vectors outputted by the natural language description models, the first feature vectors outputted by the natural language description models being corresponding to different feature types; a fusion module, configured to fuse the first feature vectors outputted by the natural language description models, to obtain a second feature vector; and a generation module, configured to generate target natural language description information according to the second feature vector, the target natural language description information being used for expressing the media resource in natural language.

According to another aspect of the embodiments of this application, a storage medium is further provided, storing a computer program, the computer program being configured to perform the method according to any one of the foregoing aspects when being run.

According to another aspect of the embodiments of this application, an electronic device is further provided, including a memory and a processor, the memory storing a computer program, and the processor being configured to perform the method according to any one of the foregoing aspects by using the computer program.

In the embodiments of this application, an architecture with a plurality of natural language description models is used to respectively process a media object, to fuse first feature vectors of different feature types extracted by the models into a second feature vector; and then target natural language description is generated according to the second feature vector to represent the media object, so as to integrate different types of information with a semantic complementary characteristic in the media object to jointly generate the target natural language description for the media object, so that the generated target natural language description more accurately reflects content of the media object. Therefore, a technical effect of improving accuracy of description of the media object given by the natural language description generated for the media object is implemented, and further, a technical problem that the natural language description generated for the media object can only give an insufficiently accurate description of the media object in the related art is resolved.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

To make a person skilled in the art better understand solutions of this application, the technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms such as "first" and "second" in the specification, the claims, and the foregoing accompanying drawings of this application are intended to distinguish between similar objects, but are not necessarily used for describing a particular sequence or a chronological order. It is to be understood that the data termed in such a way are interchangeable in proper circumstances, so that the embodiments of this application described herein can be implemented in orders other than the order illustrated or described herein. Moreover, the terms "include", "comprise" and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
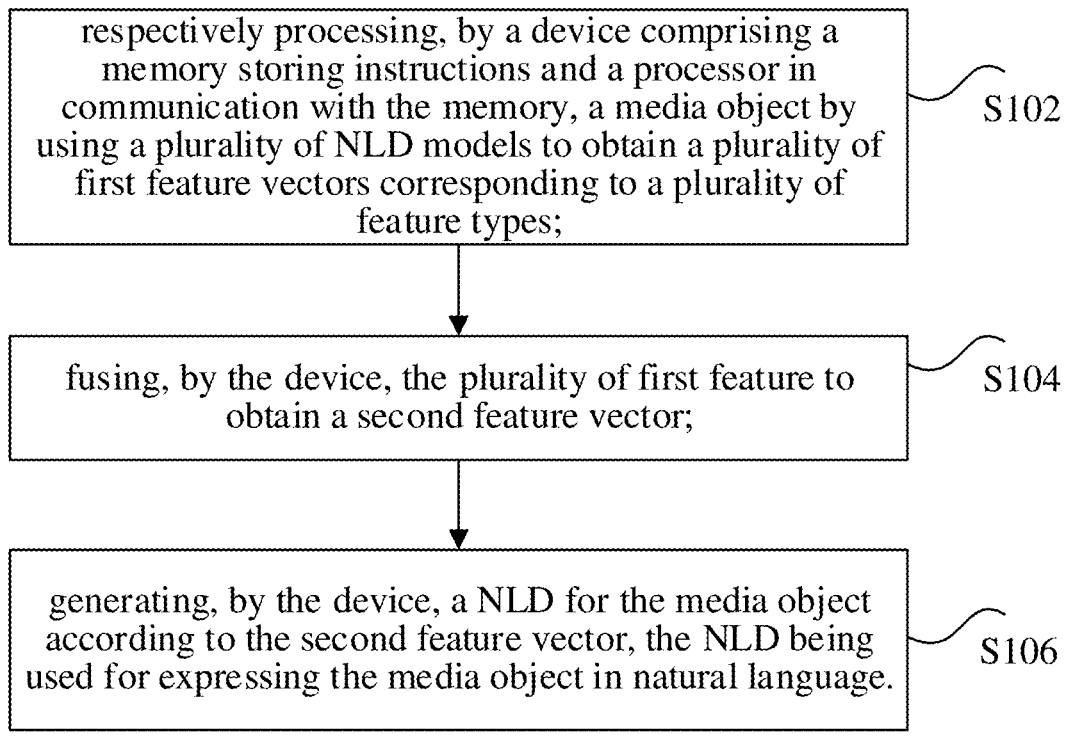
FIG. 1 is a schematic diagram of an optional method for generating natural language description according to an embodiment of this application.

According to one aspect of the embodiments of this application, a method for generating natural language description (NLD) for a media object (or a media resource) is provided. As shown in FIG. 1, the method includes the following steps. In some implementations, the generating natural language description may refer to as generating natural language description information.

Step S102 may include respectively processing, by a device comprising a memory storing instructions and a processor in communication with the memory, a media object by using a plurality of NLD models to obtain a plurality of first feature vectors corresponding to a plurality of feature types. In another implementation, step S102 may include respectively processing a media resource (or a media object) by using a plurality of natural language description models, to obtain first feature vectors outputted by the natural language description models, the first feature vectors outputted by the natural language description models being corresponding to different feature types.

Each of the plurality of natural language description models is configured to generate natural language description according to input information, and the natural language description is used for expressing the input information of the natural language description model by using natural language.

Step S104 may include fusing, by the device, the plurality of first feature to obtain a second feature vector. In another implementation, step S104 may include fusing the first feature vectors outputted by the natural language description models, to obtain a second feature vector.

Step S106 may include generating, by the device, a NLD for the media object according to the second feature vector, the NLD being used for expressing the media object in natural language. In another implementation, step S106 may include generating target natural language description (or target natural language description information) according to the second feature vector, the target natural language description being used for expressing the media object in natural language.

Figure 2:
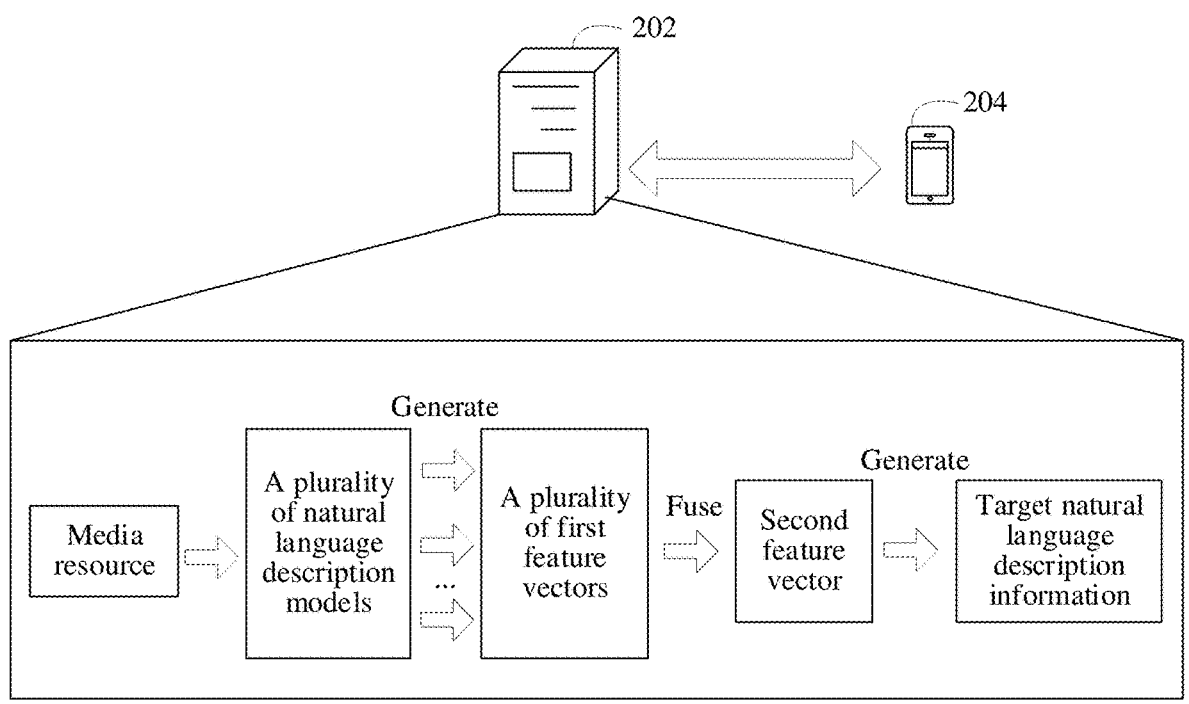
FIG. 2 is a schematic diagram of an application environment of an optional method for generating natural language description according to an embodiment of this application.

In various embodiments, the foregoing method for generating natural language description may be applicable to a hardware environment formed by a server 202 and a client 204 shown in FIG. 2. As shown in FIG. 2, the server 202 respectively processes a media object by using a plurality of natural language description models and obtains a first feature vector outputted by each natural language description model, to obtain a plurality of first feature vectors. Each first feature vector corresponds to one feature type, and each first feature vector corresponds to a different feature type. That is, the server 202 may obtain first feature vectors of a plurality of feature types. Then, the server 202 fuses the first feature vectors of the plurality of feature types to obtain a second feature vector, and generates target natural language description according to the second feature vector, the target natural language description being used for expressing the media object in natural language.

In various embodiments, the server 202 may perform operations such as classification, viewing, and retrieval of the media object according to the target natural language description. In this way, services are provided for the client 204.

In various embodiments, the foregoing method for generating natural language description may be applied to, but is not limited to, a scenario of generating natural language description for a media object. The client may be, but is not limited to, various types of applications, applets, websites, and the like, and may be, for example, of an online education type, an instant messaging type, a community space type, a game type, a shopping type, browsers, a finance type, a multimedia type, and a live broadcast type. Specifically, the client may be applied to, but is not limited to, a scenario of generating natural language description for a media object in the foregoing multimedia application, or may further be applied to, but is not limited to, a scenario of generating natural language description for a media object in the foregoing instant messaging application, to improve accuracy of description of the media object given by the natural language description generated for the media object. The foregoing description is merely an example, which is not limited in embodiment.

In various embodiments, the media object may include, but is not limited to: a video resource, an audio resource, an image resource, a webpage resource, and the like.

In various embodiments, each first feature vector in the plurality of first feature vectors includes one or more features for representing the media object. The second feature vector fused by the plurality of first feature vectors includes one or more features for representing the media object.

In various embodiments, the natural language description may include, but is not limited to, a sentence, a phrase, a word group, and the like in various languages. The languages may be, for example, English, Chinese, Spanish, French, Italian, and Arabic.

In various embodiments, the plurality of natural language description models are different natural language description models trained separately, and can describe the media object from different angles, so that the second feature vector obtained by fusing the plurality of first feature vectors generated by the plurality of natural language description models can carry comprehensive information of the media object, to enable the target natural language description to describe the media object more accurately.

Figure 3:
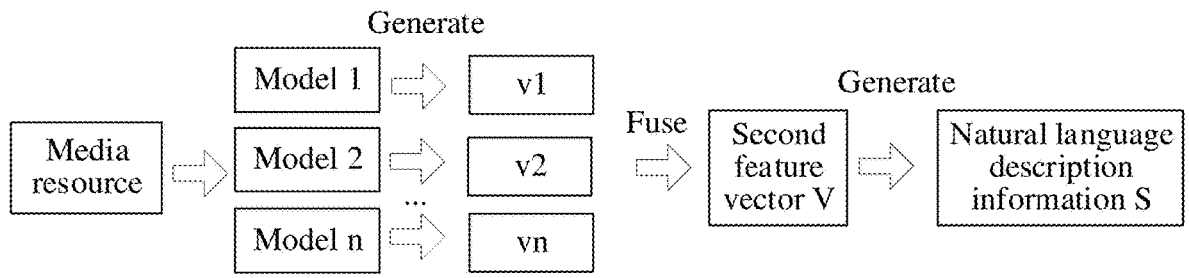
FIG. 3 is a schematic diagram of an optional method for generating natural language description according to an optional implementation of this application.

In an optional implementation, an example in which the media object is a video resource is used. As shown in FIG. 3, a plurality of natural language description models are trained, which are specifically: a model 1, a model 2, . . . , and a model n. The video resource is processed by using the model 1, the model 2, . . . , and the model n, to obtain a plurality of first feature vectors (v1, v2, . . . , and vn) of a plurality of feature types outputted by the model 1, the model 2, . . . , and the model n. v1, v2, . . . , and vn are fused into a second feature vector V, and natural language description S is generated according to the second feature vector V.

It can be seen from the above steps that, the natural language description model is configured to generate the natural language description according to the input information to describe input information of the model. The natural language description is generated by using the feature vector extracted from the input information. An architecture with a plurality of natural language description models is used, to fuse the first feature vectors of different feature types extracted by the models into the second feature vector; and then target natural language description is generated according to the second feature vector to represent the media object, so as to integrate different types of information in the media object to jointly generate the target natural language description for the media object, so that the generated target natural language description more accurately reflects content of the media object. Therefore, a technical effect of improving accuracy of description of the media object given by the natural language description generated for the media object is implemented, and further, a technical problem that the natural language description generated for the media object can only give an insufficiently accurate description of the media object in the related art is resolved.

In an optional solution, the respectively processing a media object by using a plurality of natural language description models, to obtain first feature vectors outputted by the natural language description models includes the following steps:

S1. Obtain the media object, and determining a block included in the media object. In one implementation, the block included in the media block (or a media resource) may be a resource block.

S2. Input the resource block as input information into each natural language description model of the plurality of natural language description models.

S3. Generate one first feature vector by using the each natural language description model of the plurality of natural language description models, the one first feature vector including a first feature corresponding to the resource block.

In various embodiments, the block included in the media object may be, but is not limited to, any manner of dividing the media object. The media object may include, but is not limited to, one or more blocks (or resource blocks). A video resource is used as an example, a resource block of the video resource may be, but is not limited to be, divided according to frames. One resource block may include, but is not limited to, one or more video frames. Alternatively, the resource block of the video resource may be, but is not limited to be, divided according to time. One resource block may be, but not limited to, a video segment that lasts for one or more seconds. A picture resource is used as an example. A resource block of the picture resource may be, but not limited to be, divided according to pixels. One resource block may be, but is not limited to, a picture area including one or more pixels. Alternatively, the resource block of the video resource may be, but is not limited to be, divided according to sizes. One resource block may be, but not limited to, a picture area of a predetermined size.

In various embodiments, each natural language description model generates a first feature for each resource block, so that each natural language description model generates a first feature corresponding to the resource block for the media object, to obtain a first feature vector including the first features.

In an optional solution, the media object includes a plurality of resource blocks, and the generating one first feature vector by using the each natural language description model of the plurality of natural language description models includes the following steps:

S1. Process the plurality of resource blocks by using a feature extraction model included in the each natural language description model, the feature extraction model being configured to extract the first feature from each of the resource blocks, to obtain a plurality of first features.

S2. Obtain sequence information of the plurality of resource blocks, the sequence information being used for indicating a sequence of the plurality of resource blocks in the media object.

S3. Sequentially encode the plurality of first features by using the sequence information, to obtain the first feature vector.

In various embodiments, the sequence information may include, but is not limited to: time series information, location sequence information, spatio-temporal sequence information, and the like. The time series information may be used for indicating a time sequence of a plurality of resource blocks in a media object. The location sequence information may be used for indicating an arrangement location sequence of a plurality of resource blocks in a media object. The spatio-temporal sequence information may be used for indicating an arrangement sequence in time and space of a plurality of resource blocks in a media object. For example, in a video resource processing scenario, time series information of a video frame may be used for encoding; and in an image resource processing scenario, a location sequence of different areas may be used for encoding.

In various embodiments, sequential encoding may include, but is not limited to: temporal encoding, spatial encoding, spatio-temporal encoding, and the like.

In various embodiments, the plurality of first features are extracted from the plurality of resource blocks of the media object. The first features may be out of order. Sequence information of the plurality of resource blocks is obtained from the media object. The first feature vector obtained by sequentially encoding the first features according to the sequence information can carry the sequence information of the plurality of resource blocks, and can reflect an arrangement sequence of the plurality of first features in the media object.

Figure 4:
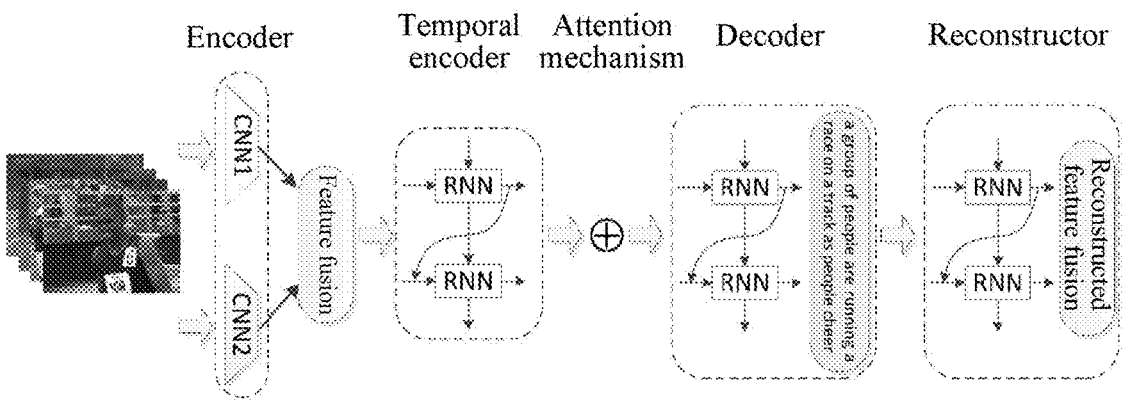
FIG. 4 is a schematic diagram of another optional method for generating natural language description according to an optional implementation of this application.

In an optional implementation, a process of generating natural language description of a video resource is used as an example. As shown in FIG. 4, for a video segment with m frames of images, an encoder of each natural language description model obtains different types of features of each frame of image: $V^i=\{v_1^i, v_2^i, \ldots, v_m^i\}$, $V^j=\{v_1^j, v_2^j, \ldots, v_m^j\}$, where i and j represent different types of features. Features of the same image are fused to obtain a fused image feature sequence $V=\{v_1, v_2, \ldots, v_m\}$. Subsequently, a temporal encoder performs temporal encoding on the feature sequence at this stage, and fuses time series information of the video segment into the image feature sequence. Before the decoder generates a description, an attention mechanism assigns a specific weight to each image feature. A weight sum of the feature sequence is a feature expression of the video segment. The decoder uses the video feature expression generated at this stage as input, and generates a corresponding natural language description in the form of predicting one word at each step. After the natural language description is generated, a reconstructor reconstructs an input video feature according to a hidden state of each step of the decoder, that is, $\tilde{V}=\{\tilde{v}_1, \tilde{v}_2, \ldots, \tilde{v}_m\}$. In the training process, an indicator for measuring quality of sentences by people is directly used as an optimization goal by using a "self-evaluation" method for reinforcement learning, to train a model. In an application, a plurality of natural language description models that have been trained are fused at a prediction end of the decoder. A second feature vector is obtained according to a plurality of first feature vectors, to jointly generate the same piece of target natural language description.

In an optional solution, the each natural language description model may include a plurality of feature extraction models, each of the feature extraction models being corresponding to a different feature type; and the processing the plurality of resource blocks by using a feature extraction model included in the each natural language description model includes the following steps:

S1. Input the plurality of resource blocks into the feature extraction models included in the each natural language description model, and obtain a set of second features outputted by each of the feature extraction models, to obtain a plurality of sets of second features, each set of second features in the plurality of sets of second features including a feature in a one-to-one correspondence with each of the resource blocks.

S2. Fuse features corresponding to the same resource block in the plurality of sets of second features into one feature, to obtain a plurality of the first features.

In various embodiments, the plurality of feature extraction models may be, but are not limited to, a plurality of types of convolutional neural networks, such as networks including P3D, C3D, and I3D, to perform feature extraction on each frame of image.

In various embodiments, different features, such as a C3D feature and a P3D feature, are features extracted from a video by using an algorithm or a network referred to as C3D or P3D. Such algorithms or networks may be used to classify images or videos. Such models process images or videos and can output category information. Intermediate output of such classification models may be extracted as features of images or videos. Different algorithms or network models have different methods for extracting features, efficiency thereof is different, and extracted features are also different. Therefore, different algorithms or network models may be used to extract different types of features.

In various embodiments, there may be, but not limited to, two major types of features included: 2D convolution features and 3D convolution features. The 2D convolution feature such as an InceptionV4 feature, a Resnet152 feature, an Inception_Resnet_v2 feature, a nasnet feature, and a pnasnet feature, may act on a single image to extract a feature of the single image. The 3D convolution feature such as a C3D feature, a P3D feature, and an I3D feature, may act on a plurality of consecutive images. Extracted features include time series information between the images, and content of the extracted features may be richer than that of the 2D convolution features.

In an optional implementation, based on that a plurality of types of image features (that is, a plurality of sets of second features) are obtained, two feature fusion policies may be used: one is a direct feature cascading method, and the other is a method in which dimension reduction is first performed on features, and then the features are cascaded.

Herein, two types of features, that is, I3D features and P3D features, are used as an example to illustrate the two feature fusion policies. Herein, $V^i=\{v_1^i, v_2^i, \ldots, v_m^i\}$ represents an I3D feature sequence, and a length of each feature is 1024 dimensions. $V^j=\{v_1^j, v_2^j, \ldots, v_m^j\}$ represents a P3D feature sequence, and a length of each feature is 2048 dimensions.

For the direct feature cascading method, features corresponding to the same frame or area in different feature sequences are connected in a length dimension:

$$v_t = [v_t^i, v_t^j]$$

The above formula represents a direct cascade of two different features in a $t^{th}$ frame or a $t^{th}$ area. Herein, a length dimension of $v_t$ is 3072 dimensions.

For the method in which dimension reduction is first performed on features, and then the features are cascaded, a linear layer such as an FC layer is first used to reduce a high dimensional feature to the target dimensional feature:

$$v_t^i \sim FC(v_t^i)$$

$$v_t^j \sim FC(v_t^j)$$

Then, corresponding features in different feature sequences are connected in a length dimension.

$$v_t = [Fc(v_t^i), Fc(v_t^j)]$$

The above formula represents that two different dimension-reduced features in a $t^{th}$ frame or a $t^{th}$ area are cascaded. Herein, a length dimension of $v_t$ is twice a target dimension.

In an optional solution, the sequentially encoding the plurality of first features by using the sequence information, to obtain the first feature vector includes the following steps:

S1. Input the first feature into a sequential encoder according to the sequence.

S2. Generate a time series feature vector by using the sequential encoder.

S3. Process the time series feature vector by using an attention mechanism model, to obtain a plurality of third features, the attention mechanism model being configured to determine a weighted feature corresponding to each resource block according to a correlation between the each resource block and a resource feature.

S4. Process the plurality of third features by using a decoder model included in the each natural language description model, the decoder model being configured to generate the first feature vector according to the plurality of third features.

In various embodiments, the sequential encoder may include, but is not limited to: a temporal encoder and the like.

Figure 5:
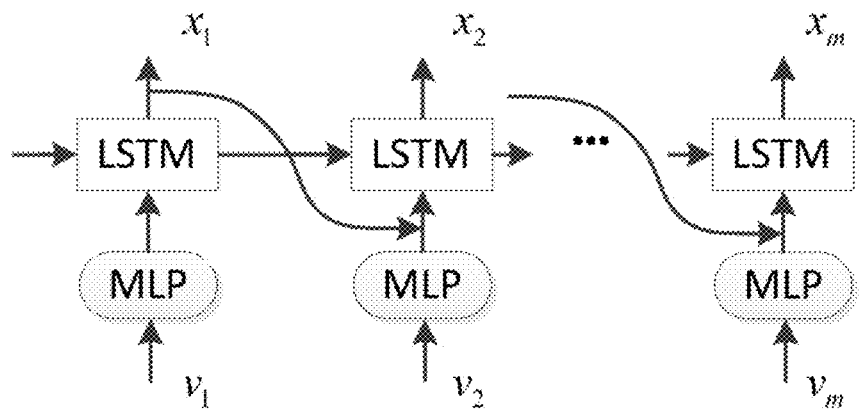
FIG. 5 is a schematic diagram of another optional method for generating natural language description according to an optional implementation of this application.

In an optional embodiment, the temporal encoder may include a multi-layer perceptron and a recurrent neural network (RNN). The neural network may be a common RNN unit, a long short-term memory (LSTM) unit, a gated recurrent unit (GRU), and the like. An LSTM unit is used as an example. As shown in FIG. 5, the fused feature sequence obtained at the previous stage does not include a time series relationship between two features and a plurality of features. In the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory) Likewise, a processor (or processors and memory) can be used to implement one or more units. Moreover, each unit can be part of an overall unit that includes the functionalities of the unit. The description here also applies to the term unit and other equivalent terms. The temporal encoder reads the feature sequence in a correct order into an MLP for the first time for further dimensionality reduction, and then inputs the feature sequence into the LSTM unit. The temporal encoder outputs one state corresponding to an input feature at each step. The state is a feature expression obtained after the input feature is embedded in the time series information at that time point:

$$x_t = \text{LSTM}(v_t, x_{t-1})$$

where $x_t$ not only represents a hidden state of an LSTM network at a time point t, but also represents an image feature expression obtained after temporal encoding at that time point. Finally, a feature sequence $X = \{x_1, x_2, \ldots, x_m\}$ containing time series information is obtained.

Figure 6:
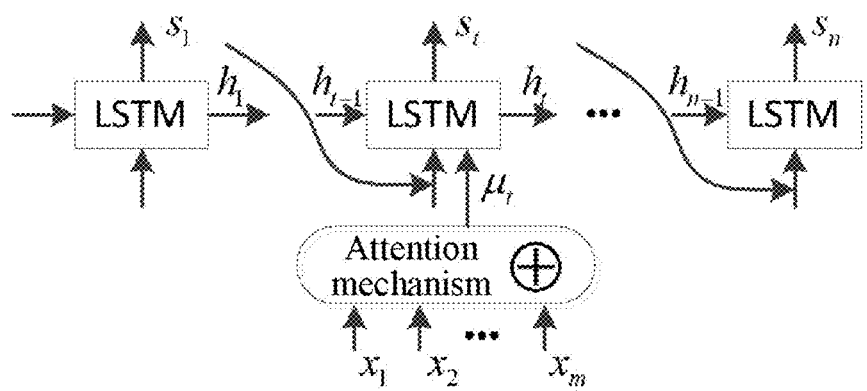
FIG. 6 is a schematic diagram of another optional method for generating natural language description according to an optional implementation of this application.

In the above optional implementation, as shown in FIG. 6, the decoder may include an RNN, to generate natural language description in units of words. When generating a word at each step, for the decoder to focus on capturing an image feature related to the word, an attention mechanism is introduced, to dynamically determine and select a key image feature. The attention mechanism assigns a relatively large feature weight to a currently important feature, and conversely, assigns a relatively small feature weight. After the attention mechanism integrates features, an integrated feature of the video at the current time point is obtained:

$$\mu_t = \sum_{i=1}^{m} \alpha_i^t x_i$$

$\alpha_i^t$ represents a feature weight assigned to an image feature $x_i$ by the attention mechanism at the time point t, and complies with $\Sigma_{i=1}^{m} \alpha_i^t = 1$; and $\mu_t$ represents a feature obtained after the attention mechanism performs dynamic selection and integration.

At each time point, the decoder obtains a word predicted at the current time point according to the following formula:

$$h_t = \text{LSTM}(s_{t-1}, h_{t-1}, \mu_t)$$

$$s_t = \max(\text{SoftMax}(h_t))$$

where $h_t$ represents a $t^{th}$ hidden state of a decoder network, $s_t \in S = \{s_1, s_2, \ldots, s_n\}$ represents a $t^{th}$ word in the sentence S, and SoftMax( ) is a function for obtaining a word probability distribution. In a training process, a loss function of the decoder is:

$$\mathcal{L}_{dec} = \sum_{i=1}^{N} \{-\log P(S^i \mid V^i; \theta)\}$$

where $P(S^i \mid V^i; \theta)$ represents a probability of generating a natural language description for a video segment, and $\theta$ represents a to-be-optimized parameter of the network.

In an optional solution, the media object includes a plurality of resource blocks, each first feature vector in the plurality of first feature vectors includes a plurality of fourth features in a one-to-one correspondence with the plurality of resource blocks, and the fusing the plurality of first feature vectors to obtain a second feature vector includes the following steps:

S1. Extract a plurality of feature sets in a one-to-one correspondence with the plurality of resource blocks from the plurality of first feature vectors, each feature set in the plurality of feature sets including a fourth feature corresponding to one of the plurality of resource blocks in the plurality of first feature vectors.

S2. Obtain an average feature of each feature set in the plurality of feature sets, to obtain a plurality of average features in a one-to-one correspondence with the plurality of resource blocks.

S3. Determine a feature vector including the plurality of average features as the second feature vector.

In various embodiments, average pooling is performed on a hidden state sequence $H=\{h_1, h_2, \ldots, h_n\}$ of each decoder according to the resource blocks, that is, average pooling is performed on each $h_1$, average pooling is performed on each $h_2$, ..., and average pooling is performed on each $h_n$. Each obtained average feature is determined as a feature included in the second feature vector.

In an optional solution, the media object includes a first quantity of resource blocks, the second feature vector includes a first quantity of features corresponding to the first quantity of resource blocks, and the generating target natural language description according to the second feature vector includes the following steps:

S1. Process the first quantity of features by using an objective function, to obtain a second quantity of words that maximize the objective function, the objective function being a function for obtaining a word probability distribution.

S2. Integrate the second quantity of words into a sentence, and determine the sentence as the target natural language description.

In various embodiments, the first quantity and the second quantity may be the same or different. That is, the first quantity of features may be or may be not in a one-to-one correspondence with the second quantity of words.

In various embodiments, a sentence integrated according to the second quantity of words may be in a form of, but not limited to, a sentence, a word group, a phrase, and the like. In other words, the sentence may be in a form of a sentence with a subject-verb-object structure, a sentence with a subject-verb-object-attributive-adverbial-complement structure, a phrase with a verb-object structure, or the like.

In various embodiments, the objective function is a function for obtaining a word probability distribution, for example, a function SoftMax( ).

In an optional solution, before the respectively processing a media object by using a plurality of natural language description models, to obtain first feature vectors outputted by the natural language description models, the method further includes the following steps:

S1. Train each model of a plurality of initial natural language description models by using a resource sample, to obtain a plurality of first models whose first loss function meets a first preset condition, the first loss function being a loss function configured according to the each model of the plurality of initial natural language description models.

S2. Train each joint model of a plurality of joint models by using the resource sample, to obtain a plurality of second models whose second loss function meets a second preset condition, the each joint model of the plurality of joint models being a model obtained by cascading one of the first models and a reconstructor model, the reconstructor model being configured to reconstruct a feature of the resource sample according to a description result outputted by an optimized model, and the second loss function being a loss function configured according to the each joint model.

S3. Train the plurality of second models, to obtain a plurality of natural language description models whose evaluation parameter meets a third preset condition.

Optimization of the initial natural language description model, the joint model, and the second model can be implemented by training the initial natural language description model, the joint model, and the second model by using the resource sample. When a loss function or another evaluation parameter of the above models meets a respective corresponding preset condition, the training can be stopped.

The preset condition may be set according to actual requirements. For example, the preset condition may be set to that: the loss function or the evaluation parameter is in a state of convergence. In another example, the preset condition may be set to that: the loss function or the evaluation parameter is less than a preset threshold.

In various embodiments, the model training process may include, but is not limited to three parts:

In a first part, a conventional training method may be used to train a model without a reconstructor portion, and an optimization goal is to minimize a loss function $\mathcal{L}$ dec of the decoder.

In a second part, based on that training of the model in the first part is completed, a reconstructor is added, and the training is still performed by using the conventional method. In this case, an optimization goal is to minimize a joint loss function $\mathcal{L}=\mathcal{L}_{dec}+\mathcal{L}_{rec}$.

In a third part, based on that training of the model in the second part is completed, the model is further trained by using the "self-evaluation" method for reinforcement learning. An optimization goal is a METEOR value that is an indifferentiable indicator for evaluating quality of natural sentences. Because a gradient of METEOR is unobtainable, a conventional training method of obtaining a gradient of a loss function and then updating a parameter by using gradient descent is no longer used herein. The reinforcement learning algorithm can exactly resolve this problem. Generally, an optimization goal of reinforcement learning based on a "bottom line" may be expressed as:

$$\min_\theta (-r(S^i) + b)$$

$r(S^i)$ is an optimization indicator, a "bottom line" b is any function irrelevant to $S^i$, which is introduced to reduce a high deviation of gradient estimation in a single sample. By using the "self-evaluation" method, the "bottom line" b is the METEOR value obtained by the model during a verification stage, that is, $b=r(\hat{S}^i)$. $\hat{S}^i$ is natural language description generated by the current model during the verification stage. This method uses an indicator $r(\hat{S}^i)$ thereof as a "bottom line" to optimize the method, and is thus referred to as "self-evaluation."

Figure 7:
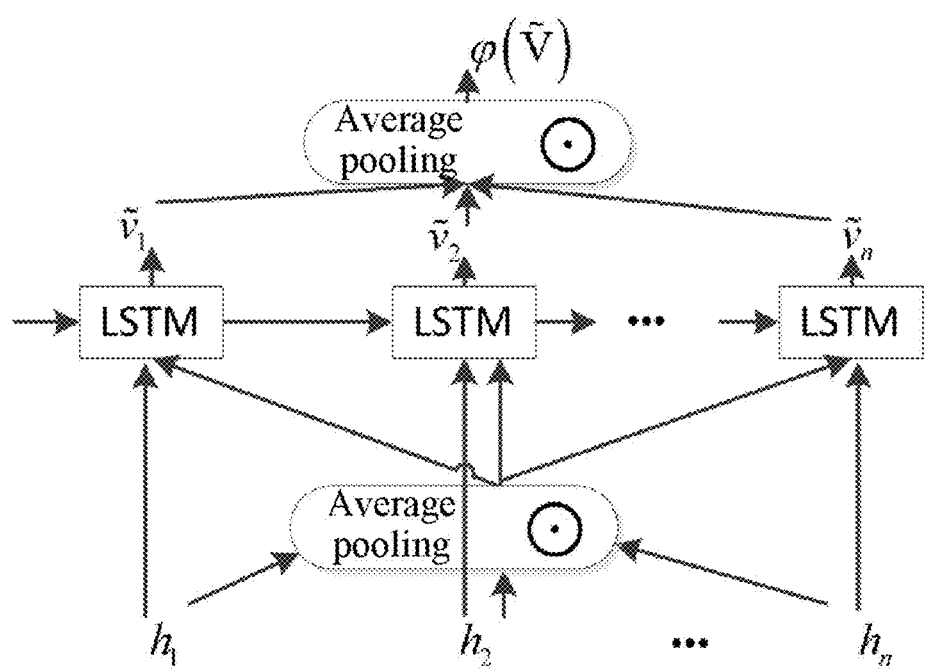
FIG. 7 is a schematic diagram of another optional method for generating natural language description according to an optional implementation of this application.

In an optional implementation, a reconstructor network may include an RNN. The reconstructor reconstructs a global feature of the video by using a hidden state sequence $H=\{h_1, h_2, \ldots, h_n\}$ of the decoder. As shown in FIG. 7, before the global feature of the video is reconstructed, average pooling is performed on the hidden state sequence $H=\{h_1, h_2, \ldots, h_n\}$ of the decoder, to obtain a global expression of a predicted natural language description:

$$\varphi(H) = \frac{1}{n}\sum_{i=1}^{n} h_i$$

φ(·) represents an average pooling operation. At each time point of the reconstructor, the reconstructor uses the average feature, a currently corresponding decoder state $h_t$, and a state $\tilde{v}_{t-1}$ thereof at a previous time point as input, to generate a new hidden state $\tilde{v}_t$. In addition, the hidden state is also used as a reconstructed feature of the current time point.

$$\tilde{v}_t = LSTM(\tilde{v}_{t-1}, h_t, \varphi(H))$$

$$\varphi(\tilde{V}) = \frac{1}{n}\sum_{t=1}^{n}\tilde{v}_t$$

Finally, the average feature is used in the hidden state sequence $\tilde{V}=\{\tilde{v}_1, \tilde{v}_2, \ldots, \tilde{v}_n\}$ of the reconstructor, to obtain a feature expression $\varphi(\tilde{V})$ representing a global structure of the video segment.

A Euclidean distance between an original video feature and a reconstructed video feature is used as a loss function of the reconstructor network, and is expressed as:

$$\mathcal{L}_{rec}=E(\varphi(\tilde{V}),\varphi(V))$$

Herein, E(·) represents the Euclidean distance.

To make the description simple, the foregoing method embodiments are stated as a series of action combinations. However, a person skilled in the art shall be aware that that this application is not limited to the described sequence of the actions because according to this application, some steps may use another sequence or may be simultaneously performed. In addition, a person skilled in the art shall also be aware that all the embodiments described in the specification are exemplary embodiments, and the related actions and modules are not necessarily mandatory to this application.

Figure 8:
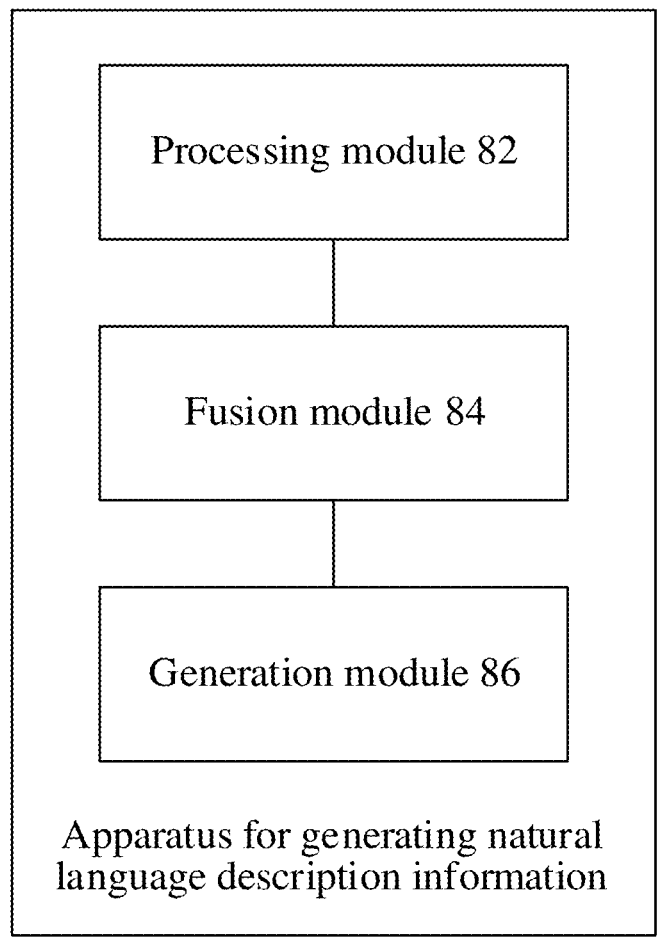
FIG. 8 is a schematic diagram of an optional apparatus for generating natural language description according to an embodiment of this application.

According to another aspect of the embodiments of this application, an apparatus for generating natural language description used for implementing the foregoing method for generating natural language description is further provided. As shown in FIG. 8, the apparatus includes:

a processing module 82, configured to respectively process a media object by using a plurality of natural language description models, to obtain first feature vectors outputted by the natural language description models, the first feature vectors outputted by the natural language description models being corresponding to different feature types;

a fusion module 84, configured to fuse the first feature vectors outputted by the natural language description models, to obtain a second feature vector; and a generation module 86, configured to generate target natural language description according to the second feature vector, the target natural language description being used for expressing the media object in natural language. In the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory) Likewise, a processor (or processors and memory) can be used to implement one or more modules. Moreover, each module can be part of an overall module that includes the functionalities of the module. The description here also applies to the term unit and other equivalent terms.

In an optional solution, the processing module includes:

a first obtaining unit, configured to obtain the media object, and determine a resource block included in the media object;

a first input unit, configured to input the resource block as input information into each natural language description model of the plurality of natural language description models; and a generation unit, configured to respectively generate one first feature vector by using the each natural language description model of the plurality of natural language description models, the one first feature vector including a first feature corresponding to the resource block.

In an optional solution, the media object includes a plurality of resource blocks, where the generation unit includes:

a processing subunit, configured to process the plurality of resource blocks by using a feature extraction model included in the each natural language description model, the feature extraction model being configured to extract the first feature from each of the resource blocks, to obtain a plurality of first features;

an obtaining subunit, configured to obtain sequence information of the plurality of resource blocks, the sequence information being used for indicating a sequence of the plurality of resource blocks in the media object; and an encoding subunit, configured to sequentially encode the plurality of first features by using the sequence information, to obtain the first feature vector.

In an optional solution, the each natural language description model includes a plurality of feature extraction models, each of the feature extraction models being corresponding to a different feature type; and the processing subunit is configured to:

input the plurality of resource blocks into the feature extraction models included in the each natural language description model, and obtain a set of second features outputted by each of the feature extraction models, to obtain a plurality of sets of second features, each set of second features in the plurality of sets of second features including a plurality of features in a correspondence with a plurality of the resource blocks; and fuse features corresponding to the same resource block in the plurality of sets of second features into one feature, to obtain a plurality of the first features.

In an optional solution, the encoding subunit is configured to:

input the first feature into a sequential encoder according to the sequence;

generate a time series feature vector by using the sequential encoder;

process the time series feature vector by using an attention mechanism model, to obtain a plurality of third features, the attention mechanism model being configured to determine a weighted feature corresponding to each resource block according to a correlation between the each resource block and a resource feature; and process the plurality of third features by using a decoder model included in the each natural language description model, the decoder model being configured to generate the first feature vector according to the plurality of third features.

In an optional solution, the media object includes a plurality of resource blocks, each first feature vector in the plurality of first feature vectors includes a plurality of fourth features in a one-to-one correspondence with the plurality of resource blocks, and the fusion module includes:

an extraction unit, configured to extract a plurality of feature sets in a one-to-one correspondence with the plurality of resource blocks from the plurality of first feature vectors, each feature set in the plurality of feature sets including a fourth feature corresponding to one of the plurality of resource blocks in the plurality of first feature vectors;

a second obtaining unit, configured to obtain an average feature of each feature set in the plurality of feature sets, to obtain a plurality of average features in a one-to-one correspondence with the plurality of resource blocks; and a determining unit, configured to determine a feature vector including the plurality of average features as the second feature vector.

In an optional solution, the media object includes a first quantity of resource blocks, the second feature vector includes a first quantity of features corresponding to the first quantity of resource blocks, and the generation module includes:

a processing unit, configured to process the first quantity of features by using an objective function, to obtain a second quantity of words that maximize the objective function, the objective function being a function for obtaining a word probability distribution; and an integration unit, configured to integrate the second quantity of words into a sentence, and determine the sentence as the target natural language description.

In an optional solution, the apparatus further includes:

a first training module, configured to train each model of a plurality of initial natural language description models by using a resource sample, to obtain a plurality of first models whose first loss function meets a first preset condition, the first loss function being a loss function configured according to the each model of the plurality of initial natural language description models;

a second training module, configured to train each joint model of a plurality of joint models by using the resource sample, to obtain a plurality of second models whose second loss function meets a second preset condition, the each joint model of the plurality of joint models being a model obtained by cascading one of the first models and a reconstructor model, the reconstructor model being configured to reconstruct a feature of the resource sample according to a description result outputted by the first model, and the second loss function being a loss function configured according to the each joint model; and a third training module, configured to train the plurality of second models, to obtain a plurality of natural language description models whose evaluation parameter meets a third preset condition.

Figure 9:
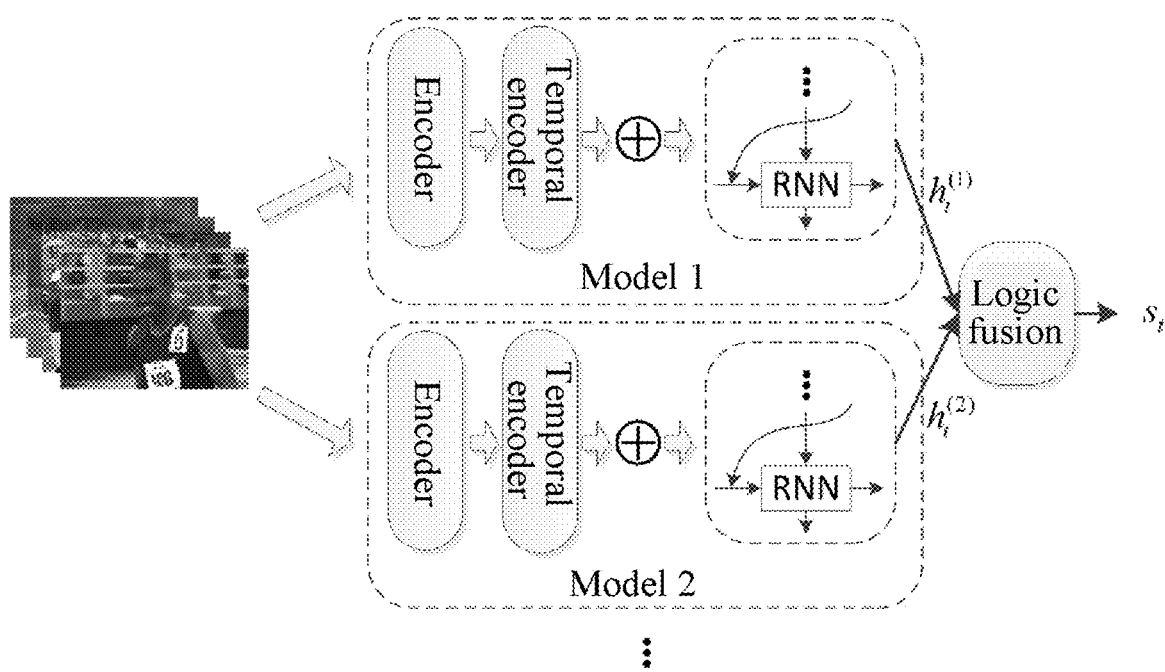
FIG. 9 is a schematic diagram of an application scenario of an optional method for generating natural language description according to an embodiment of this application.

In an optional embodiment, the foregoing method for generating natural language description may be applied to, but is not limited to, a scenario of generating natural language description for a media object as shown in FIG. 9. In this scenario, a method for generating video segment description information based on video time series information and multi-scale fusion is provided. This method may be used on a cloud to generate a natural language paragraph description for a video segment in a database. This method may complete fusion, extraction and reconstruction of video segment features, encoding of time series information, and generation of a natural language description through a neural network.

In this scenario, the image encoder extracts a convolutional neural network feature for each frame of image of the video segment, and further processes the feature by using an RNN (a temporal encoder), to obtain an image feature expression including time series information of the video segment. The image feature expression that is extracted at this stage and that includes the time series information is further processed by using a non-linear network, to obtain a video segment feature expression carrying key frame information. Then, the RNN (decoder) is used to generate a natural language description for the video segment feature expression, and another RNN (reconstructor) is used to reconstruct a feature of the input video according to a description generated at this stage. The generation of the natural language description is restricted by reducing a difference between the reconstructed video feature and an original video feature. Then, the description generation network is further trained by using a "self-evaluation" structure in a reinforcement learning algorithm. Finally, a plurality of networks that have been trained are fused at a word prediction end, to generate a more accurate video segment description. By means of the above process, an accurate natural language description can be generated for the video segment, so that the video segment can be effectively understood and analyzed.

In this scenario, a convolutional neural network is used to fuse different types of features of the same video segment. The advantage of fusing features is that complementary semantic information in different features can be used at the same time. A temporal encoder is constructed by using the ability of the RNN to process time series data. The temporal encoder further processes an image feature generated by the encoder, encodes video time series information into the image feature, and makes full use of the time series information provided by a video sequence. A purpose of constructing the reconstructor by using the RNN is to obtain backward semantic information in the training data. By using the "self-evaluation" structure in the reinforcement learning algorithm for training, an indicator about which people are concerned is directly optimized, thereby facilitate further improvement of performance. For the plurality of models that have been trained, the prediction ends of the plurality of models are fused during application, and respective characteristics of different models are used to generate a more accurate natural language description for the video segment.

By using the above method, video content understanding services can be provided. In a back-end server, the encoder extracts different types of features from each frame of image of the video, and performs feature fusion. Then, a fused feature is processed by the temporal encoder to obtain a high-level image feature sequence embedded with the video time series information, and a natural language description is obtained by using the decoder. Furthermore, the natural language description is reconstructed as an inputted video feature by using the reconstructor network. The entire process uses the "self-evaluation" structure in the reinforcement learning algorithm for training. Finally, a plurality of models that have been trained are fused at prediction ends thereof to generate a natural language description. The models may be deployed on video websites for video classification, viewing and quick retrieval.

In an optional implementation, as shown in FIG. 9, for the plurality of models trained by using the above solution, because different types and quantities of features are used for training the models and the models focus on different aspects of performance, descriptions generated by the plurality of models for the same video segment are different. By fusing a plurality of models to generate the same natural language description, the advantage that different models focus on different aspects can be attained, making the description more accurate. In application, decoder prediction ends are fused, and one word is collectively generated at each time point.

At the same time point, decoder states of the plurality of models are fused as follows:

$$h_t = \frac{1}{q}\sum_{k=1}^{q} h_t^{(k)}$$

$$s_t = \max(\text{SoftMax}(h_t))$$

An average value of different decoder states at the same time point is obtained. $h_t^{(k)}$ represents a decoder state of a $k^{th}$ model at a time point t, and q represents a quantity of models. For an averaged decoder state $h_t$, a probability distribution of a word list is obtained by using a SoftMax function, to further obtain a word $s_t$ at the time point t. At a time point t+1, $s_t$ is used as common input of a plurality of model decoders.

Through the above process, information of a plurality of types of features, the time series information in the video segment, and two-way information between the video segment and the natural language description can be effectively obtained at the same time, and a plurality of models can be used to generate a natural language description, thereby effectively improving existing video description capabilities. In addition, the generated video description can be used for video classification, viewing, and quick retrieval, thereby having potential economic benefits.

In addition to the above method for generating video description information, other methods for fusing a plurality of types of video features, encoding video time series information by using an RNN, and fusing a plurality of types of models that have been trained to improve accuracy of video description in a method for generating a video description also fall within the protection scope of this embodiment.

Figure 10:
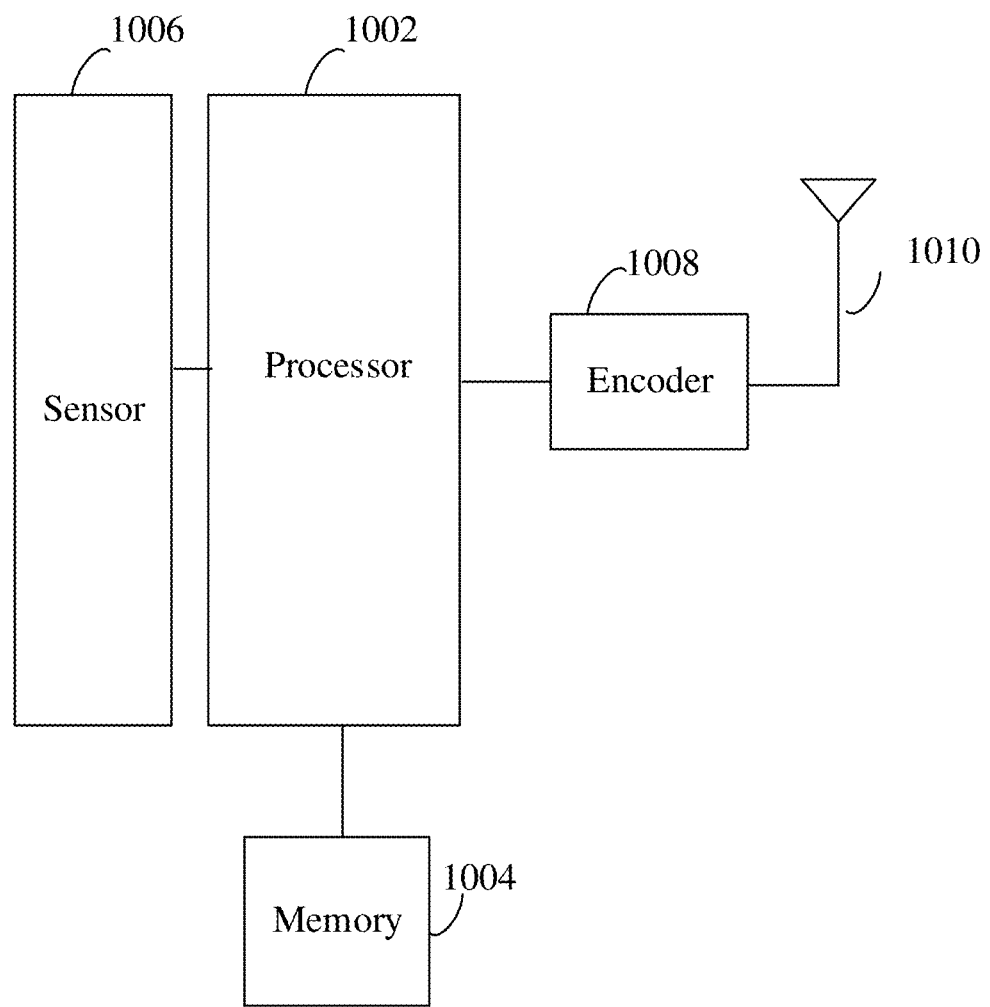
FIG. 10 is a schematic diagram of an optional electronic device according to an embodiment of this application.

According to still another aspect of the embodiments of this application, an electronic device configured to perform the foregoing method for generating natural language description is further provided. As shown in FIG. 10, the electronic device includes: one or more (only one is shown in the figure) processors 1002, a memory 1004, a sensor 1006, an encoder 1008, and a transmission apparatus 1010. The memory stores a computer program, and the processor is configured to perform the steps in any one of the foregoing method embodiments by using the computer program.

In various embodiments, the electronic device may be located in at least one of a plurality of network devices in a computer network.

In various embodiments, the processor may be configured to perform the following steps by using the computer program:

S1. Respectively process a media object by using a plurality of natural language description models, to obtain first feature vectors outputted by the natural language description models, the first feature vectors outputted by the natural language description models being corresponding to different feature types.

S2. Fuse the first feature vectors outputted by the natural language description models, to obtain a second feature vector.

S3. Generate target natural language description according to the second feature vector, the target natural language description being used for expressing the media object in natural language.

A person of ordinary skill in the art may understand that, the structure shown in FIG. 10 is only illustrative. The electronic device may be a terminal device such as a smartphone (for example, an Android mobile phone or an iOS mobile phone), a tablet computer, a palmtop computer, a mobile Internet device (MID), or a PAD. FIG. 10 does not limit the structure of the electronic device. For example, the electronic device may further include more or fewer components (such as a network interface and a display apparatus) than those shown in FIG. 10, or have a configuration different from that shown in FIG. 10.

The memory 1002 may be configured to store a software program and module, for example, a program instruction/module corresponding to the method and the apparatus for generating natural language description in the embodiments of this application. The processor 1004 runs the software program and module stored in the memory 1002, to perform various functional applications and data processing, that is, implement the foregoing method for generating natural language description. The memory 1002 may include a high-speed random memory, and may further include a non-volatile memory such as one or more magnetic storage apparatuses, a flash memory, or another non-volatile solid-state memory. In some embodiments, the memory 1002 may further include memories remotely disposed relative to the processor 1004, and the remote memories may be connected to a terminal through a network. Examples of the network include, but are not limited to, the Internet, an intranet, a local area network, a mobile communication network, and a combination thereof.

The transmission apparatus 1010 is configured to receive or transmit data through a network. Specific examples of the foregoing network may include a wired network and a wireless network. In an example, the transmission apparatus 1010 includes a network interface controller (NIC). The NIC may be connected to another network device and a router through a network cable, so as to communicate with the Internet or a local area network. In an example, the transmission apparatus 1010 is a radio frequency (RF) module, configured to communicate with the Internet in a wireless manner.

Specifically, the memory 1002 is configured to store an application.

An embodiment of this application further provides a storage medium, storing a computer program, the computer program being configured to perform, when run, the steps in any one of the foregoing method embodiments.

In various embodiments, the storage medium may be configured to store a computer program used for performing the following steps:

S1. Respectively process a media object by using a plurality of natural language description models, to obtain first feature vectors outputted by the natural language description models, the first feature vectors outputted by the natural language description models being corresponding to different feature types.

S2. Fuse the first feature vectors outputted by the natural language description models, to obtain a second feature vector.

S3. Generate target natural language description according to the second feature vector, the target natural language description being used for expressing the media object in natural language.

In various embodiments, the storage medium is further configured to store a computer program used for performing the steps included in the methods according to the foregoing embodiments, and details are not described again in embodiment.

In various embodiments, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash memory, a read-only memory (ROM), a random access memory (RAM), a magnetic disk, an optical disc, or the like.

The sequence numbers of the embodiments of this application are merely for description purpose, and do not indicate the preference among the embodiments.

In a case that the integrated unit in the foregoing embodiments is implemented in the form of a software functional unit and sold or used as an independent product, the integrated unit may be stored in the foregoing computer-readable storage medium. Based on such an understanding, the technical solutions of this application essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, it is to be understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units can exist alone physically, or two or more units are integrated into one unit. The integrated unit may be implemented in the form of hardware, or may be implemented in the form of a software functional unit.

The foregoing descriptions are merely exemplary implementations of this application. A person of ordinary skill in the art may make several improvements and modifications without departing from the principle of this application, and the improvements and modifications shall fall within the protection scope of this application.

What is claimed is:

1. A method for generating a natural language description (NLD) for a media object, the method comprising:
   respectively processing, by a device comprising a memory storing instructions and a processor in communication with the memory, a media object by using a plurality of NLD models to obtain a plurality of first feature vectors corresponding to a plurality of feature types;
   fusing, by the device, the plurality of first feature to obtain a second feature vector;
   generating, by the device, a NLD for the media object according to the second feature vector, the NLD being used for expressing the media object in natural language,
   wherein, before the respectively processing the media object by using the plurality of NLD models, training each model of a plurality of initial NLD models by using a sample, to obtain a plurality of first models whose first loss function meets a first preset condition, the first loss function being a loss function configured according to each model of the plurality of initial NLD models;
   training each joint model of a plurality of joint models by using the sample, to obtain a plurality of second models whose second loss function meets a second preset condition, the each joint model of the plurality of joint models being a model obtained by cascading one of the first models and a reconstructor model, the reconstructor model being configured to reconstruct a feature of the sample according to a description result outputted by the first model, and the second loss function being a loss function configured according to the each joint model; and
   training the plurality of second models, to obtain a plurality of NLD models whose evaluation parameter meets a third preset condition.

2. The method according to claim 1, wherein the respectively processing the media object by using the plurality of NLD models to obtain the plurality of first feature vectors corresponding to the plurality of feature types comprises:
   obtaining the media object;
   determining a block comprised in the media object;
   inputting the block as input information into each NLD model of the plurality of NLD models; and
   respectively generating a first feature vector by using the each NLD model, the first feature vector comprising a first feature corresponding to the block.

3. The method according to claim 2, wherein:
   the media object comprises a plurality of blocks; and
   the generating the first feature vector by using the each NLD model comprises:
      processing the plurality of blocks by using a feature extraction model comprised in the each NLD model to extract a plurality of first features,
      obtaining sequence information of the plurality of blocks, the sequence information indicating a sequence of the plurality of blocks in the media block, and
      sequentially encoding the plurality of first features based on the sequence information to obtain the first feature vector.

4. The method according to claim 3, wherein:
   the each NLD model comprises a plurality of feature extraction models;
   each of the feature extraction models corresponds to a different feature type; and the processing the plurality of blocks by using the feature extraction model comprised in the each NLD model to extract the plurality of first features comprises:
- inputting the plurality of blocks into each of the plurality of feature extraction models comprised in the each NLD model,
- obtaining a set of second features outputted by the each of the feature extraction models, to obtain a plurality of sets of second features, each set of second features in the plurality of sets of second features comprising a feature in a one-to-one correspondence with each of the blocks, and
- fusing features corresponding to a same block in the plurality of sets of second features to obtain the plurality of first features.

5. The method according to claim 3, wherein the sequentially encoding the plurality of first features based on the sequence information to obtain the first feature vector comprises:
- inputting the first feature into a sequential encoder according to the sequence information;
- generating a time series feature vector by using the sequential encoder;
- processing the time series feature vector by using an attention mechanism model, to obtain a plurality of third features, the attention mechanism model being configured to determine a weighted feature corresponding to each block according to a correlation between the each block and a block feature; and
- processing the plurality of third features by using a decoder model comprised in the each NLD model to generate the first feature vector.

6. The method according to claim 1, wherein:
the media object comprises a first quantity of blocks;
the second feature vector comprises a first quantity of features corresponding to the first quantity of blocks; and
the generating the NLD for the media object according to the second feature vector comprises:
- processing the first quantity of features to obtain a second quantity of words that maximize an objective function, the objective function being a function for obtaining a word probability distribution, and
- integrating the second quantity of words into a sentence, and determining the sentence as the NLD for the media object.

7. An apparatus for generating a natural language description (NLD) for a media object, the apparatus comprising:
a memory storing instructions; and
a processor in communication with the memory, wherein, when the processor executes the instructions, the processor is configured to cause the apparatus to:
respectively process a media object by using a plurality of natural language description (NLD) models to obtain a plurality of first feature vectors corresponding to a plurality of feature types,
fuse the plurality of first feature to obtain a second feature vector,
generate a NLD for the media object according to the second feature vector, the NLD being used for expressing the media object in natural language,
wherein, before the processor is configured to cause the apparatus to respectively process the media object by using the plurality of NLD models, the processor is configured to further cause the apparatus to train each model of a plurality of initial NLD models by using a sample, to obtain a plurality of first models whose first loss function meets a first preset condition, the first loss function being a loss function configured according to each model of the plurality of initial NLD models;
train each joint model of a plurality of joint models by using the sample, to obtain a plurality of second models whose second loss function meets a second preset condition, the each joint model of the plurality of joint models being a model obtained by cascading one of the first models and a reconstructor model, the reconstructor model being configured to reconstruct a feature of the sample according to a description result outputted by the first model, and the second loss function being a loss function configured according to the each joint model; and
train the plurality of second models, to obtain a plurality of NLD models whose evaluation parameter meets a third preset condition.

8. The apparatus according to claim 7, wherein, when the processor is configured to cause the apparatus to respectively process the media object by using the plurality of NLD models to obtain the plurality of first feature vectors corresponding to the plurality of feature types, the processor is configured to cause the apparatus to:
obtain the media object;
determine a block comprised in the media object;
input the block as input information into each NLD model of the plurality of NLD models; and
respectively generate a first feature vector by using the each NLD model, the first feature vector comprising a first feature corresponding to the block.

9. The apparatus according to claim 8, wherein:
the media object comprises a plurality of blocks; and
when the processor is configured to cause the apparatus to generate the first feature vector by using the each NLD model, the processor is configured to cause the apparatus to:
- process the plurality of blocks by using a feature extraction model comprised in the each NLD model to extract a plurality of first features,
- obtain sequence information of the plurality of blocks, the sequence information indicating a sequence of the plurality of blocks in the media block, and
- sequentially encode the plurality of first features based on the sequence information to obtain the first feature vector.

10. The apparatus according to claim 9, wherein:
the each NLD model comprises a plurality of feature extraction models;
each of the feature extraction models corresponds to a different feature type; and
when the processor is configured to cause the apparatus to process the plurality of blocks by using the feature extraction model comprised in the each NLD model to extract the plurality of first features, the processor is configured to cause the apparatus to:
- input the plurality of blocks into each of the plurality of feature extraction models comprised in the each NLD model,
- obtain a set of second features outputted by the each of the feature extraction models, to obtain a plurality of sets of second features, each set of second features in the plurality of sets of second features comprising a feature in a one-to-one correspondence with each of the blocks, and
- fuse features corresponding to a same block in the plurality of sets of second features to obtain the plurality of first features.

11. The apparatus according to claim 9, wherein, when the processor is configured to cause the apparatus to sequentially encode the plurality of first features based on the sequence information to obtain the first feature vector, the processor is configured to cause the apparatus to:
  input the first feature into a sequential encoder according to the sequence information;
  generate a time series feature vector by using the sequential encoder;
  process the time series feature vector by using an attention mechanism model, to obtain a plurality of third features, the attention mechanism model being configured to determine a weighted feature corresponding to each block according to a correlation between the each block and a block feature; and
  process the plurality of third features by using a decoder model comprised in the each NLD model to generate the first feature vector.

12. The apparatus according to claim 7, wherein:
  the media object comprises a first quantity of blocks;
  the second feature vector comprises a first quantity of features corresponding to the first quantity of blocks; and
  when the processor is configured to cause the apparatus to generate the NLD for the media object according to the second feature vector, the processor is configured to cause the apparatus to:
    process the first quantity of features to obtain a second quantity of words that maximize an objective function, the objective function being a function for obtaining a word probability distribution, and
    integrate the second quantity of words into a sentence, and determine the sentence as the NLD for the media object.

13. A non-transitory computer readable storage medium, storing computer readable instructions, wherein, the computer readable instructions, when executed by a processor, are configured to cause the processor to perform:
  respectively processing a media object by using a plurality of natural language description (NLD) models to obtain a plurality of first feature vectors corresponding to a plurality of feature types;
  fusing the plurality of first feature to obtain a second feature vector;
  generating a NLD for the media object according to the second feature vector, the NLD being used for expressing the media object in natural language,
  wherein, before the respectively processing the media object by using the plurality of NLD models, training each model of a plurality of initial NLD models by using a sample, to obtain a plurality of first models whose first loss function meets a first preset condition, the first loss function being a loss function configured according to each model of the plurality of initial NLD models;
  training each joint model of a plurality of joint models by using the sample, to obtain a plurality of second models whose second loss function meets a second preset condition, the each joint model of the plurality of joint models being a model obtained by cascading one of the first models and a reconstructor model, the reconstructor model being configured to reconstruct a feature of the sample according to a description result outputted by the first model, and the second loss function being a loss function configured according to the each joint model; and
  training the plurality of second models, to obtain a plurality of NLD models whose evaluation parameter meets a third preset condition.

14. The non-transitory computer readable storage medium according to claim 13, wherein, when the computer readable instructions are configured to cause the processor to perform respectively processing the media object by using the plurality of NLD models to obtain the plurality of first feature vectors corresponding to the plurality of feature types, the computer readable instructions are configured to cause the processor to perform:
  obtaining the media object;
  determining a block comprised in the media object;
  inputting the block as input information into each NLD model of the plurality of NLD models; and
  respectively generating a first feature vector by using the each NLD model, the first feature vector comprising a first feature corresponding to the block.

15. The non-transitory computer readable storage medium according to claim 14, wherein:
  the media object comprises a plurality of blocks; and
  when the computer readable instructions are configured to cause the processor to perform generating the first feature vector by using the each NLD model, the computer readable instructions are configured to cause the processor to perform:
    processing the plurality of blocks by using a feature extraction model comprised in the each NLD model to extract a plurality of first features,
    obtaining sequence information of the plurality of blocks, the sequence information indicating a sequence of the plurality of blocks in the media block, and
    sequentially encoding the plurality of first features based on the sequence information to obtain the first feature vector.

16. The non-transitory computer readable storage medium according to claim 15, wherein:
  the each NLD model comprises a plurality of feature extraction models;
  each of the feature extraction models corresponds to a different feature type; and
  when the computer readable instructions are configured to cause the processor to perform processing the plurality of blocks by using the feature extraction model comprised in the each NLD model to extract the plurality of first features, the computer readable instructions are configured to cause the processor to perform:
    inputting the plurality of blocks into each of the plurality of feature extraction models comprised in the each NLD model,
    obtaining a set of second features outputted by the each of the feature extraction models, to obtain a plurality of sets of second features, each set of second features in the plurality of sets of second features comprising a feature in a one-to-one correspondence with each of the blocks, and
    fusing features corresponding to a same block in the plurality of sets of second features to obtain the plurality of first features.

17. The non-transitory computer readable storage medium according to claim 15, wherein, when the computer readable instructions are configured to cause the processor to perform sequentially encoding the plurality of first features based on the sequence information to obtain the first feature vector, the computer readable instructions are configured to cause the processor to perform:

inputting the first feature into a sequential encoder according to the sequence information;

generating a time series feature vector by using the sequential encoder;

processing the time series feature vector by using an attention mechanism model, to obtain a plurality of third features, the attention mechanism model being configured to determine a weighted feature corresponding to each block according to a correlation between the each block and a block feature; and processing the plurality of third features by using a decoder model comprised in the each NLD model to generate the first feature vector.

18. The non-transitory computer readable storage medium according to claim 13, wherein:

the media object comprises a first quantity of blocks;

the second feature vector comprises a first quantity of features corresponding to the first quantity of blocks; and when the computer readable instructions are configured to cause the processor to perform generating the NLD for the media object according to the second feature vector, the computer readable instructions are configured to cause the processor to perform:

processing the first quantity of features to obtain a second quantity of words that maximize an objective function, the objective function being a function for obtaining a word probability distribution, and integrating the second quantity of words into a sentence, and determining the sentence as the NLD for the media object.

* * * * *